Dec. 1, 1925.

E. V. SCHAAL 1,563,441

ELECTRIC FURNACE CONTROL

Filed Sept. 12, 1923

INVENTOR
Earl V. Schaal
BY
Robert H. Young
ATTORNEY

Dec. 1, 1925.  1,563,441

E. V. SCHAAL

ELECTRIC FURNACE CONTROL

Filed Sept. 12, 1923   2 Sheets-Sheet 2

INVENTOR
Earl V. Schaal
BY
Robert H. Young
ATTORNEY

Patented Dec. 1, 1925.

UNITED STATES PATENT OFFICE.

EARL V. SCHAAL, OF HARRISBURG, PENNSYLVANIA.

ELECTRIC-FURNACE CONTROL.

Application filed September 12, 1923. Serial No. 662,242.

*To all whom it may concern:*

Be it known that I, EARL V. SCHAAL, a citizen of the United States, residing at Harrisburg, in the county of Dauphin and State of Pennsylvania, have invented certain new and useful Improvements in Electric-Furnace Controls, of which the following is a specification.

This invention relates to a system of, or an apparatus for, effecting suitable control, as temperature control of electric furnaces, and the main object is to provide means for safeguarding against excessive temperatures in a furnace of this character.

A second object is to provide an automatic regulator for electric furnaces which will operate to automatically maintain a fairly constant temperature even though the main regulator is not functioning properly, due to greatly increased voltage or a similar reason.

Further objects will be more fully set forth in the attached description and in the drawings, in which.

Figure 1:
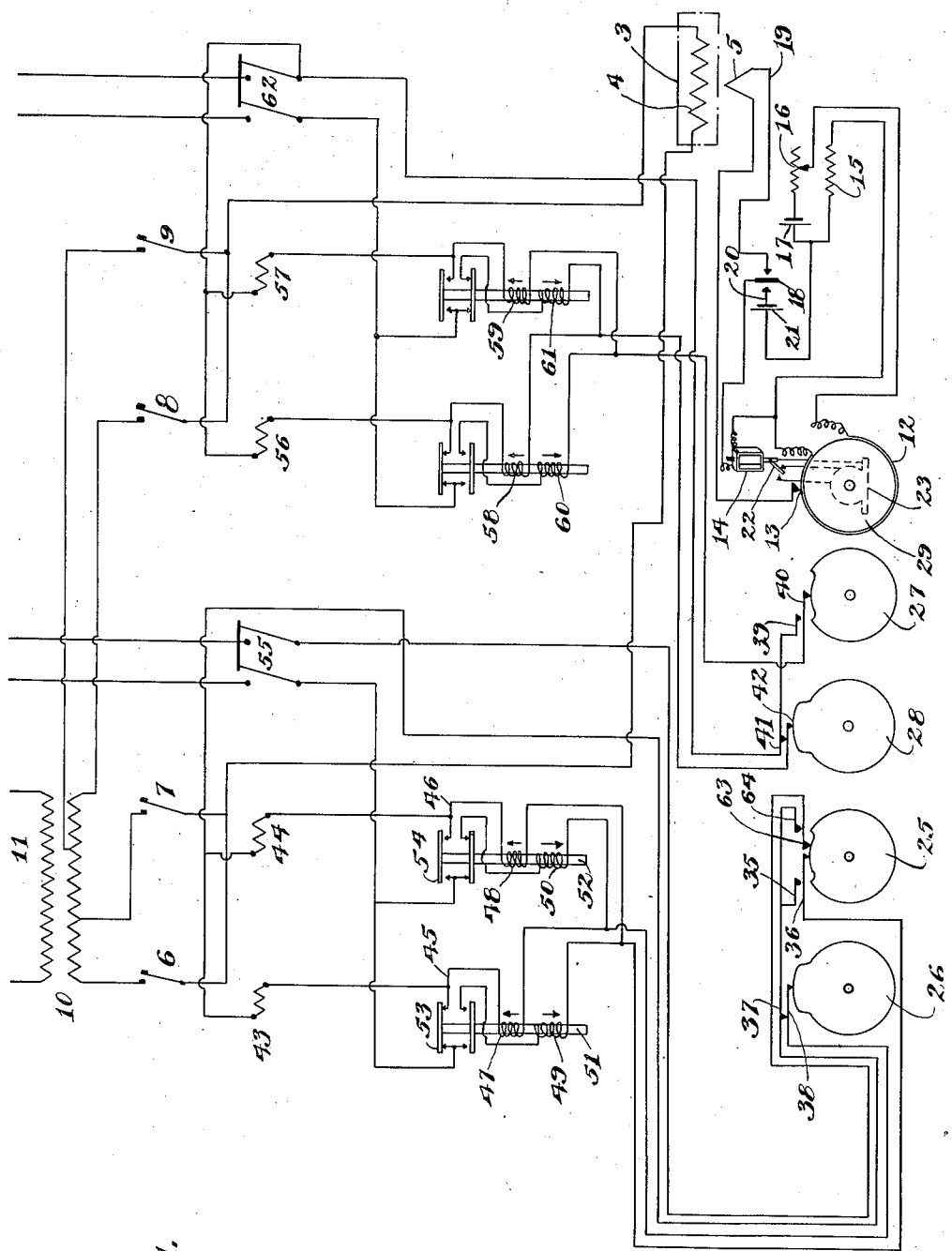
Fig. 1 is a diagrammatic view of the electrical connections in a regulator of the character described.

Referring to the drawings in which the same parts are disignated by the same reference numerals in the different views, the electric furnace designated 3 is provided with a heating coil 4 and a thermocouple 5. The heating coil 4 is connected to the switches 6, 7, 8 and 9, which are connected to the various taps as shown from the secondary of a transformer 10 which is connected to an external source of alternating current 11.

The thermocouple is connected in a potentiometer circuit formed of a coil of resistance wire 12 to which it is connected through a contact 13, a resistance 15, variable resistance 16, battery 17 and galvanometer 14. A movable switch element 18 is adapted to contact with the terminal 19, connected to the thermocouple for normal operation, but may be moved to make contact with the terminal 20, connected to standard cell 21, as shown, so that the potentiometer may be readjusted or calibrated.

The galvanometer is provided with a switch lever 22 movable with its movable coil, and this lever 22 is adapted to control an electric motor 23 in the same manner as described in Patent No. 1,356,804, October 26, 1920, to Brewer, or in Patent No. 1,287,236, Dec. 10, 1918, to Collins, so that the motor, which drives the rod 24 on which are the discs 25, 26, 27, 28 and 29, will automatically control the rotation of these discs to maintain a constant temperature in the furnace. It will be understood that the rotation of the disc 29 varies the position of the coil 12, mounted thereon, until the potentiometer circuit is again balanced and the lever 22 assumes its normal central position. The four control discs 25, 26, 27 and 28 are clamped to the shaft 24 to rotate therewith and these discs open and close contacts as will be more fully described so as to control the voltage supplied to the furnace coils. The motor 23 which turns the shaft 24 is automatically controlled by the changes in temperature as made evidence by the thermocouples as fully set forth in Patent No. 1,356,804.

The discs 25, 26, 27 and 28 are made of non-conducting material and are provided with depressions 30 and 31 in discs 25 and 27, and with raised surfaces 32 and 33 on discs 26 and 28 respectively. A fixed bar 34 forms a mounting base upon which are fastened the contact strips 35, 36 which are normally apart, with the strip 36 resting down in the depression 30. Similar contacts 37 and 38 are provided for disc 26, contacts 39 and 40 for disc 27 and contacts 41 and 42 for disc 28; contacts 35, 36 being open when contacts 37, 38 are closed and vice versa, and contacts 39, 40 being open when contacts 41, 42 are closed, and vice versa.

The several discs are connected as follows through the contacts 35 to 42 inclusive: Contacts 37 and 35 are connected to the two closing coils 43 and 44 which operate, when energized, to close the switches 6 and 7, respectively. These coils 43 and 44 are connected to electrical conductors 45 and 46 which are connected to one end of each of the opening coils 47 and 48, the other end of these coils being connected to the contacts 38 and 36 respectively. A closing coil is provided for each of the relays and they are designated by the numerals 49 and 50. Coils 49 and 50 are connected to contacts 36 and 38, respectively. It will be understood that the opening coils 47 and 48 when energized, move the solenoid cores 51 and 52 of the two relays upwardly in the direction of the arrows corresponding to these coils, so as to break the electrical connection between the conductors 45 or 46 and the left side of the switch 55 through the conducting plates 53 and 54 constructed rigid with the cores 51 and 52, respectively. These conducting plates 53 and 54 move upwardly with the cores and move away from the stationary contacts indicated by the arrow heads. When the lower closing coils 49 and 50 are energized, these cores are pulled downwardly and complete the circuit from the switch 55 through the opening coils and at the same time, break the circuit in a similar manner from the closing coils. When the cores are moved downwardly, the electrical circuit is completed from the switch 55 through the upper contact plates 53 or 54 so as to energize the operating coils 43 and 44 of the switches 6 or 7, the current path being completed through the contacts 37 and 38 or through 35 and 36 when either of these pairs of contacts are closed. The switches 6 and 7 connect to part of the transformer winding of the transformer 10 which is supplied by an external source 11, both of these switches 6 and 7 being connected to one side of the heat element of the electrical furnace, the other side of which is connected to the two right-hand switches 8 and 9 which are controlled by closing coils 56 and 57 energized by means of the opening coils 58 and 59 and the closing coils 60 and 61 in a manner similar to the operation of the opening and closing coils of the first-mentioned relays. The operating coils 56 and 57 for the main switches are directly connected to one side of the switch 62, as shown. The switches 8 and 9 are never both closed or both opened together, due to the manner in which the relay coils are connected, but when one opens, the other closes. Similarly, only one of the switches 6 and 7 is closed when the furnace is in normal operation, the particular switch depending upon the temperature of the furnace.

A variable voltage is therefore supplied through either one of the switches 6 and 7 and through either one of the switches 8 and 9 to the heating element 4 of the furnace.

Figure 2:
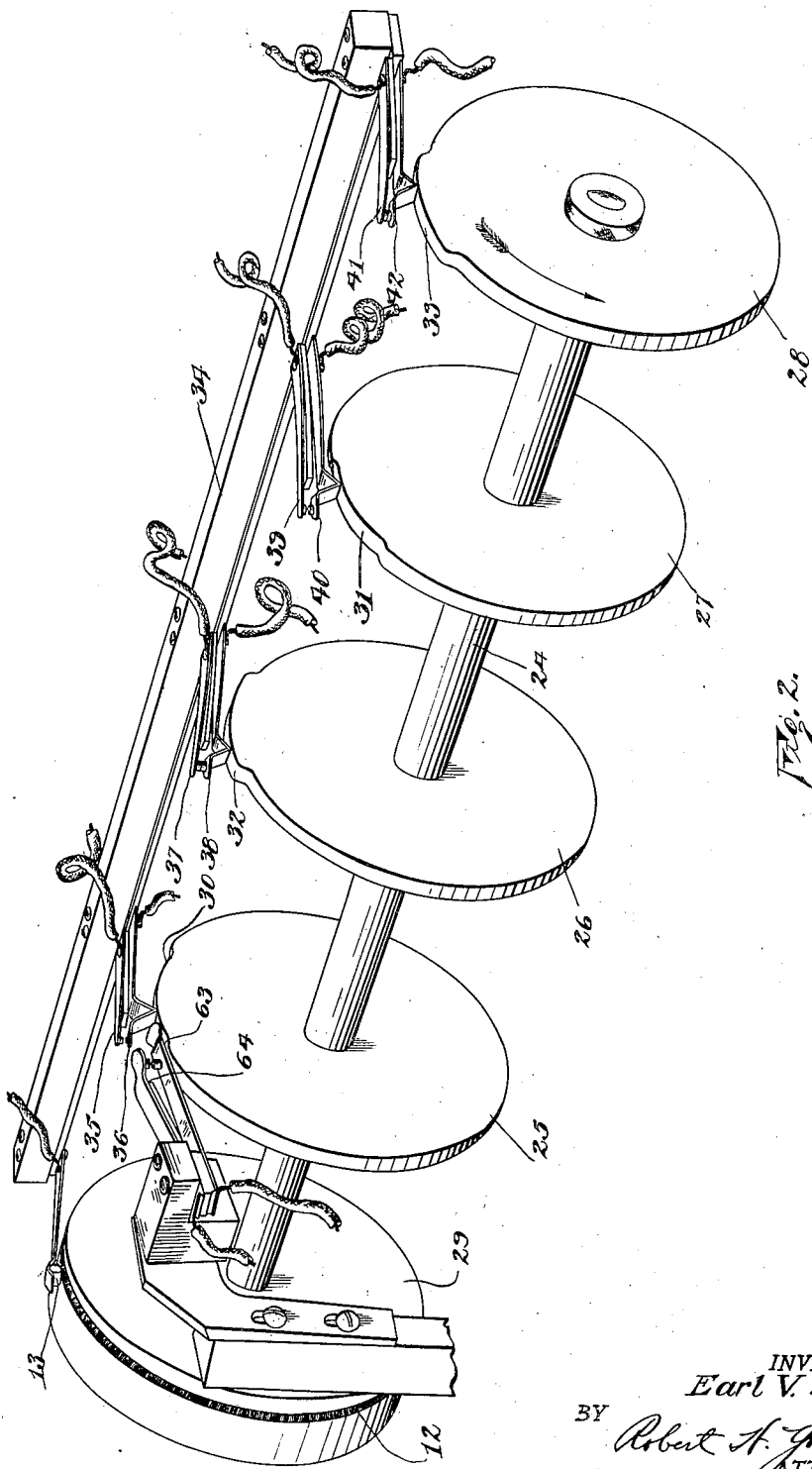
Fig. 2 is a perspective view of the contacts and contact discs.

It will be understood that in normal operation, the lower contacts 38, 36, 42 and 40 are operating upon the main circular faces of the discs 26, 25, 28 and 27, respectively. As the temperature of the furnace increases, after the furnace has been turned on, the deflection of the galvanometer 14 operates the motor to rotate the entire string of discs simultaneously in the direction of the arrow in Fig. 2 so that as the temperature of the furnace reaches a pre-determined high temperature, the contacts 42 and 40 will be operating on the projection 33 of the disc 28 and in the groove 31 of the disc 27. The contacts 36 and 38 at this time will still be operating on the main circular portions of the discs 26 and 25. When the discs have been rotated to such a point, contacts 41 and 42 will be interconnected as shown in Fig. 1 and contacts 39 and 40 will have opened as shown in the position in this figure. Since the contacts 41 and 42 are interconnected, a current will flow from the right side of the switch 62 which is connected to an external source of current, through the contacts 41 and 42 and through the closing coil 61, through the lower contact plate of the automatic relay and back to the left side of the switch 62. The relay will immediately be operated so that the core moves downwardly and so that the upper contact plate bridges the circuit between the two upper stationary contacts. Such action connects the external electrical source to the switch 62, to the closing coil 57 of the switch 9, which is thereby immediately closed. Switch 8 is immediately, and at the same time, opened by the disconnection of the coil 56 from the switch 62 which takes place as the core of the corresponding relay moves upwardly due to current flowing through the opening coil 58 when the contacts 41 and 42 are interconnected. The action as just described of the switches 8 and 9 operates to apply lower voltage to the heating element of the furnace when the furnace reaches a predetermined high temperature. After the temperature of the furnace continues to rise as it often will, due to the fluctuating line voltage, the galvanometer 14 controlled by the thermocouple 19 operates suitable contacts so as to complete a rotation of the several discs further as shown by the arrow in Fig. 2 until the discs and contacts almost reach a position as shown in Fig. 2, the contact 63 however, still riding on the main circular faces of the disc 35 so that contacts 63, and 64 above it, are electrically interconnected. The contacts 41 and 42 and 39 and 40 remain as they last were, so that the switch 9 remains closed. Contacts 37 and 38 which were previously opened, are now closed and interconnected, and the contacts 35 and 36 have now moved apart. The two contacts 63 and 64 are closely adjacent to the contacts 35 and 36, and as long as they ride on the main circular face of the disc 25, current may flow from the external source through the right side of the switch 55, through the contacts 63 and 64 so as to connect the external source to the two contacts 35 and 37 and to the left side of the operating coils 43 and 44 of the switches 6 and 7. The contacts 37 and 38 being closed at this time, permit current to flow from the switch 55 to the closing coil 50 so as to energize this coil and pull downwardly upon the core 52, thus closing the circuit from the left side of the switch 55 through coil 44 and contacts 63 and 64 back to the right side of this switch 55. The opening coil 47, of the relay corresponding to the switch 6, is at the same time energized and the core 51 of that relay pulled upwardly so as to interrupt the circuit flowing through the operating coil 43 of the switch 6. It will therefore be seen that as switch 6 is opened and switch 7 closed, a still smaller voltage will be supplied to the heating element of the furnace.

In order to provide for the possibility of an extreme fluctuation in voltage, or for any other mishap to the mechanism to prevent its proper operation, I provide the two contacts 63 and 64 positioned so that a still further rotation of the discs in the direction of the arrow in Fig. 2 will operate to break the connection between these contacts 63 and 64 and as contacts 63 is directly connected to the right side of the switch 55, all of the coils 47, 48, 49 and 50 of the relays, and both of the operating coils 43 and 44 will be entirely disconnected from the external source. Since the operating coils 43 and 44 are disconnected, they permit the switches 6 and 7, or whichever one of these may be closed, to immediately open so as to entirely disconnect the furnace heating element from the transformer secondary. The provision of these two contacts 63 and 64 so as to carry through them all of the current taken by the relay coils and energizing coils, produces a simple and quite practical construction and one which does not require any further relays or switch control coils than those already provided.

As the transformer secondary has been entirely disconnected from the furnace and the temperature, which must then necessarily fall, has again reached the low predetermined temperature required for the operation of the motor 23 to return the discs 25, 26, 27 and 28 in a direction opposite to the arrow in Fig. 2, connection will again be made between contacts 63, 64 so as to again energize the closing coil 44 of the switch 7 and again connect the low voltage to the heating element.

If the system is designed for automatic operation upon a voltage, say, for example. 220 volts, and the voltage should, by some mishap to the line, be greatly increased, the extra contact 63 and 64 alone will automatically operate, as they are closed and opened automatically by the rotation of the several discs to maintain a fairly even temperature on the furnace.

I claim:

1. The combination in an automatic furnace control, of a galvanometer having a deflecting member, a furnace heating element, a mechanism controlled by the temperature of the furnace for controlling the galvanometer, a rotatable member, a device controlled by the galvanometer for automatically operating the rotatable member, a series of relays and contacts operated by said rotatable member for automatically regulating the temperature of the furnace by supplying various voltages to said heating element, and a series of contacts automatically operated by said rotatable member for connecting and disconnecting a source of power to said relays to disconnect and connect the heating element as a whole.

2. The combination in an automatic furnace control of a galvanometer having a deflecting member, a furnace heating element, a mechanism controlled by the temperature of the furnace for controlling the galvanometer, a rotatable member, a device controlled by the galvanometer for automatically operating the rotatable member, a series of relays and contacts operated by said rotatable member for automatically regulating the temperature of the furnace by supplying various voltages to said heating element, and a series of contacts automatically operated by said rotatable member for connecting and disconnecting a source of power to said relays to disconnect and connect the heating element as a whole, so that the temperature of the furnace is maintained approximately at an even temperature by the operation of said last-named series of contacts alone.

In testimony whereof I affix my signature.

EARL V. SCHAAL.